United States Patent
Tamilmani et al.

(10) Patent No.: US 9,189,515 B1
(45) Date of Patent: Nov. 17, 2015

(54) DATA RETRIEVAL FROM HETEROGENEOUS STORAGE SYSTEMS

(71) Applicant: AMAZON TECHNOLOGIES, INC., Reno, NV (US)

(72) Inventors: Karthik Tamilmani, Redmond, WA (US); Santosh Kalki, Sammamish, WA (US)

(73) Assignee: Amazon Technologies, Inc., Reno, NV (US)

( * ) Notice: Subject to any disclaimer, the term of this patent is extended or adjusted under 35 U.S.C. 154(b) by 157 days.

(21) Appl. No.: 13/791,453

(22) Filed: Mar. 8, 2013

(51) Int. Cl.
G06F 17/30 (2006.01)

(52) U.S. Cl.
CPC .... G06F 17/30424 (2013.01); *G06F 17/30943* (2013.01)

(58) Field of Classification Search
None
See application file for complete search history.

(56) References Cited

U.S. PATENT DOCUMENTS

| | | | |
|---|---|---|---|
| 5,379,419 A * | 1/1995 | Heffernan et al. | 1/1 |
| 5,819,251 A * | 10/1998 | Kremer et al. | 1/1 |
| 5,940,819 A | 8/1999 | Beavin et al. | |
| 6,023,694 A | 2/2000 | Kouchi et al. | |
| 6,898,594 B2 | 5/2005 | Ushijima et al. | |
| 7,383,247 B2 | 6/2008 | Li et al. | |
| 7,966,313 B2 | 6/2011 | Bruno et al. | |
| 2004/0087888 A1* | 5/2004 | DiGianfilippo et al. | 604/19 |
| 2005/0038812 A1* | 2/2005 | Tirpak et al. | 707/104.1 |
| 2006/0053261 A1 | 3/2006 | Prahlad et al. | |
| 2006/0195424 A1* | 8/2006 | Wiest et al. | 707/3 |
| 2008/0010381 A1 | 1/2008 | Barraclough et al. | |
| 2008/0271048 A1* | 10/2008 | Fradkov et al. | 719/311 |
| 2009/0119669 A1* | 5/2009 | Norman et al. | 718/102 |
| 2011/0029563 A1* | 2/2011 | Coiera et al. | 707/779 |
| 2012/0179719 A1* | 7/2012 | Coiera | 707/779 |
| 2012/0246154 A1* | 9/2012 | Duan et al. | 707/728 |
| 2013/0290822 A1* | 10/2013 | Chen | 715/212 |

OTHER PUBLICATIONS

U.S. Appl. No. 61/581,515, filed Dec. 29, 2011.*
Hoang, Ken, "Non-Final Office Action dated Nov. 21, 2014", U.S. Appl. No. 13/788,057, The United States Patent and Trademark Office, Nov. 21, 2014.
Hoang, Ken, "Final Office Action dated May 4, 2015", U.S. Appl. No. 13/788,057, The United States Patent and Trademark Office, May 4, 2015.
Hoang, Ken, "Notice of Allowance mailed Sep. 10, 2015", U.S. Appl. No. 13/788,057, The United States Patent and Trademark Office, Sep. 10, 2015.

* cited by examiner

*Primary Examiner* — Jay Morrison
(74) *Attorney, Agent, or Firm* — Lindauer Law, PLLC

(57) ABSTRACT

Techniques are described for retrieving data stored in disparate datastores that support different or heterogeneous storage systems. A report description may be received from a user, the report description including multiple query templates for generating queries to retrieve data from the disparate datastores. The report description may be analyzed to determine input parameters for generating the queries. A user interface may be dynamically generated to solicit input values corresponding to the input parameters. On receiving the input values, the system may generate and execute the queries of the query plan, and combine the results based on result combination information included in the report description.

20 Claims, 9 Drawing Sheets

DATA RETRIEVAL FROM HETEROGENEOUS STORAGE SYSTEMS

BACKGROUND

Commercial enterprises and other organizations often store large amounts of data related to their operations. In some cases, an online business may store terabytes, petabytes, exabytes, or more of data describing products, sale transactions, customers, vendors, online activities of customers, and so forth. Identifying and retrieving desired data from such a large quantity of stored data may be problematic. In particular, data retrieval may be a challenge in environments where data is stored in multiple storage systems that employ different storage formats or technologies.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for retrieving data stored in datastores with different data storage formats. The retrieval may be performed through the execution of one or more queries included in a query plan, each of the one or more queries being executed to retrieve one or more result data sets from a datastore. As used herein, a datastore describes a data storage system storing any type of data in any type of storage format, using any type of data storage technology. Implementations provide for data retrieval from datastores that include relational databases, such as databases that employ a relational database management system (RDBMS). Implementations also provide for data retrieval from datastores that employ a non-relational storage format, such as a "not only SQL" (NoSQL) database that does not adhere to a relational database model.

Figure 1:
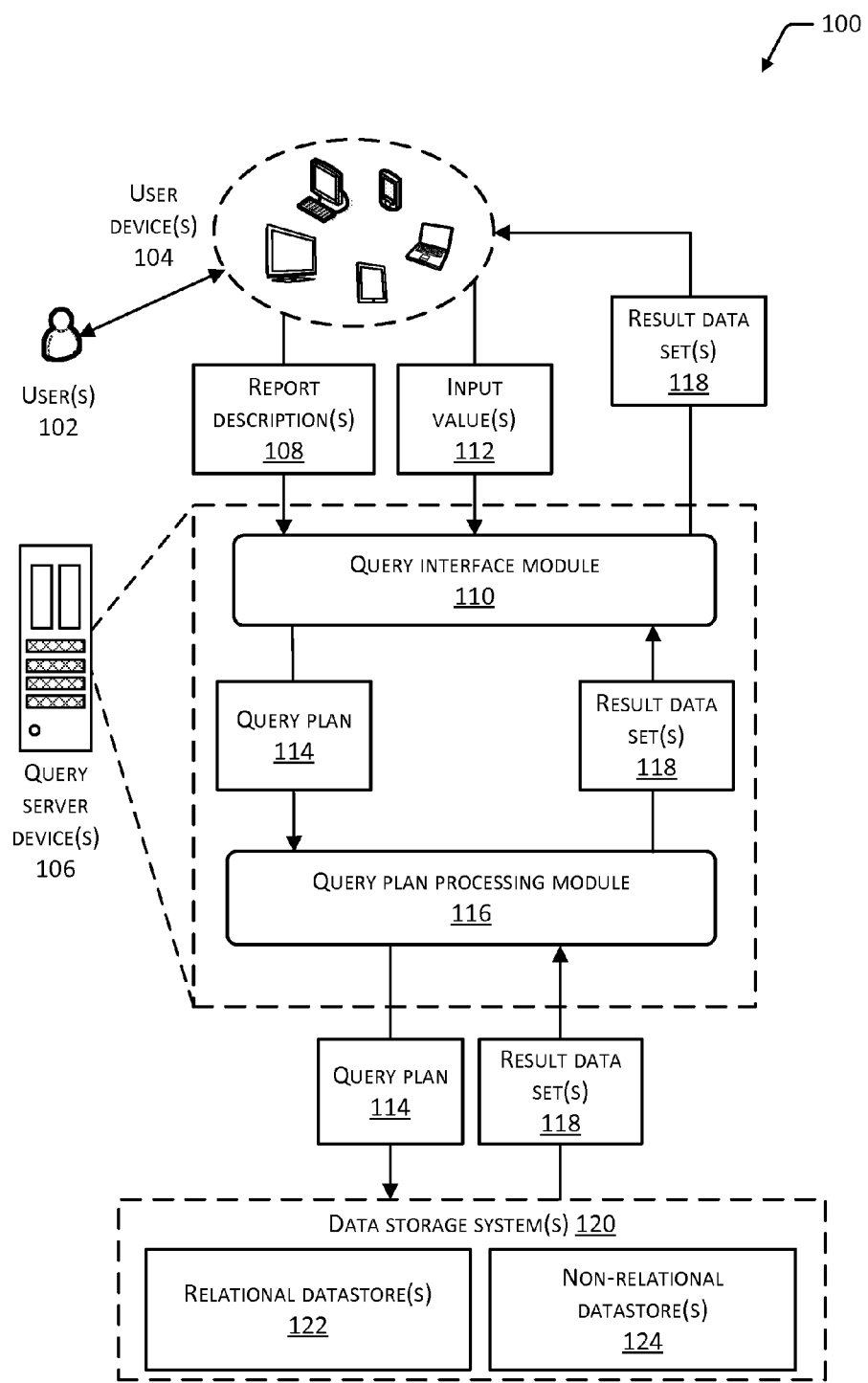
FIG. 1 depicts an environment for retrieving data from disparate storage systems, including user device(s) for providing report descriptions and receiving result data, and query server device(s) for generating and executing query plans based on the report descriptions, combining the retrieved data, and migrating data between datastores with different storage formats.

FIG. 1 depicts an environment 100 in which implementations may operate to retrieve data from disparate or heterogeneous storage systems, as described herein. In some implementations, one or more users 102 may employ one or more user devices 104 to communicate with one or more query server devices 106. The user(s) 102 may include one or more data consumers. As used herein, data consumers may refer to one or more individuals, processes, or devices that consume retrieved data. Data consumers may be associated with a business or with other types of organizations and may consume data for any purposes, such as to analyze or improve business or organizational operations, to develop or implement processes, systems, services, or products, or for other purposes. The users 102 may also include one or more users who create or author one or more report description(s) 108. Such report description(s) 108 may be used to retrieve data to be consumed by data consumers, by the author, or by other users 102.

The user device(s) 104 and the query server device(s) 106 may include any type of computing device, including but not limited to a smartphone, a personal data assistant (PDA), a tablet computer, a wearable computer, a mobile gaming device, an electronic book reader, an automotive computer, a desktop computer, a personal computer, a laptop computer, a thin client, a terminal, a game console, a smart appliance, a home entertainment device, a mainframe computer, a server computer, a network computer, and so forth. An example query server device 106 is described further with reference to FIG. 2.

In some implementations, the report description(s) 108 are sent from the user device(s) 104 to the query server device(s) 106, and may be received by a query interface module 110 executing on the query server device(s) 106. The report description(s) 108 may each include one or more query templates, and each query template may be associated with one or more input parameters. After receiving the report description(s) 108, the query server device(s) 106 may analyze the report description(s) 108 to determine the one or more input parameters for which to solicit input from a user 102. In some implementations, the data attribute(s) may be determined based on metadata that is included in the report description(s) 108 by an author of the report description(s) 108. Alternatively, the data attribute(s) may be determined based on an analysis of the query templates included in the report description(s) 108, to identify one or more unresolved or missing keys, conditions, or other data elements in the query templates. An example report description 108 is described further with reference to FIG. 3.

The input parameter(s) may include one or more conditions on one or more data attributes that are referenced by at least one of the query templates in the report description(s) 108. Such condition(s) may include a value, a set of values, or a range of values for the data attribute(s). As used herein, a data attribute may correspond to a column in a table (e.g., in a relational database) or may correspond to a searchable data element in a non-relational datastore.

A user 102 may provide one or more input values 112 through a user interface provided by the query interface module 110, each input value 112 corresponding to an input parameter of a query template of the report description 108. In some implementations, the user interface may be dynamically generated to include user interface elements that enable a user 102 to provide one or more input values 112 corresponding to the input parameter(s). The user interface may then be provided by the query interface module 110, to solicit the one or more input value(s) 112 from the user(s) 102. Alternatively, one or more preliminary queries may be executed, and output from those preliminary queries may be employed as the input value(s) 112 corresponding to the input parameter(s).

The user interface provided by the query interface module 110 may be a graphical user interface, command-line based user interface, or other type of user interface. In some cases, the query interface module 110 may provide the user interface through one or more web pages, and the user device(s) 104 may access the user interface through a web browser such as Mozilla® Firefox®, Microsoft® Internet Explorer®, Google® Chrome®, Apple® Safari®, Rockmelt®, and so forth. In such cases, the report description 108, the input value(s) 112, or other information may be sent via a web browser-supported communications protocol, such as the Hypertext Transfer Protocol (HTTP), the HTTP Secure (HTTPS), the File Transfer Protocol (FTP), and so forth. Examples of the user interface provided by the query interface module 110 are further described with reference to FIGS. 4 and 5.

On receiving the input values 112, the query interface module 110, or another module of the query server device(s) 106, may generate a query based on each query template and its corresponding one or more input values 112. Each generated query may be executable to retrieve data from one or more datastores. The one or more queries generated based on the query template(s) and the input value(s) 112 may be included in a query plan 114. In some cases, the one or more queries of the query plan 114 may correspond to one or more heterogeneous workflows that may be executed to retrieve data from a plurality of datastores that support heterogeneous storage formats. In some implementations, the report description(s) 108 may also include metadata such as result combination information used to join or otherwise combine result sets retrieved from different datastores.

The query plan 114 may be provided to a query plan processing module 116, which executes the queries of the query plan 114. The execution of the query plan 114 may result in one or more result data sets 118 retrieved from one or more datastores in one or more data storage systems 120. The datastores in the data storage system(s) 120 may include any number of databases, data storage nodes, or other data storage devices. In some cases, the datastores may include one or more processors or computing devices to perform actions for data storage, retrieval, and modification. Alternatively, the datastores may be controlled by processors or computing devices not included in the data storage system(s) 120. The datastores in the data storage system(s) 120 may store any amount of structured or unstructured data. In some cases, the amount of data stored in the data storage system(s) 120 may be on the order of exabytes.

The data storage system(s) 120 may include any number of relational datastore(s) 122. As used herein, a relational datastore describes a datastore that employs a relational storage format including one or more formally described tables, each table including one or more columns associated with data attributes. The relational datastore(s) 122 may be managed through RDBMS software. The relational datastore(s) 122 may include any number of relational databases, including but not limited to databases managed through any of the following: Oracle® and MySQL®, from Oracle Corporation of Redwood City, Calif.; DB2®, from International Business Machines (IBM) Corporation of Armonk, New York; Linter®, from the RELEX Group of Voronezh, Russia; Microsoft Access® and Microsoft SQL Server®, from Microsoft Corporation of Redmond, Wash.; PostgreSQL®, from the PostgreSQL Global Development Group; and SQLite®, from D. Richard Hipp.

The data storage system(s) 120 may also include any number of non-relational datastore(s) 124 that employ a non-relational data storage format and that may not comply with a relational database model. In some cases, the non-relational datastore(s) 124 may employ a hierarchical database model, or a network database model. The non-relational datastore(s) 124 may also include key-value datastores, hash tables, flat files, associative arrays, other types of data structures, or unstructured data storage. In some cases, the non-relational datastore(s) 124 may store metadata describing data attributes or other aspects of the stored data. The non-relational datastore(s) 124 may include any number of non-relational databases, including but not limited to databases managed through any of the following: FoxPro® database management system, from Microsoft Corporation of Redmond, Wash.; ParAccel® Analytic Database, from ParAccel, Incorporated of San Diego, Calif.; and Hadoop®, from the Apache Software Foundation.

In some cases, the datastores of the data storage system(s) 120 may store large amounts of data, on the order of petabytes, exabytes, or greater. The datastores may be subject to a high frequency of updates, for example hundreds of millions of updates daily. In some implementations, various datastores in the data storage system(s) 120 may be owned by, operated by, controlled by, or otherwise associated with different individuals, groups of individuals, or organizations. For example, a datastore A may be associated with a particular group X within an organization, and a datastore B may be associated with a particular group Y within an organization, such that the data stored in datastores A and B originates from groups X and Y respectively.

Although the data storage system(s) 120 are depicted in FIG. 1 as including both the relational datastore(s) 122 and the non-relational datastore(s) 124, implementations are not so limited. In some cases, the data storage system(s) 120 may include the relational datastore(s) 122 and may not include any non-relational datastores 124. Alternatively, the data storage system(s) 120 may include the non-relational datastore(s) 124 and may not include any relational datastores 122.

The various relational datastore(s) 122 and non-relational datastore(s) 124 of the data storage system(s) 120 may each support one or more native query languages for performing data read and write operations. For example, the relational datastore(s) 122 may support a version of the Structured Query Language (SQL). As another example, the non-relational datastore(s) 124 that implement the Hadoop® framework may support queries in the Hadoop Query Language (HQL) or MapReduce.

After receiving the result data set(s) 118 resulting from executing the query plan 114, the query plan processing module 116 may perform one or more operations to combine the result data set(s) 118 received from different datastores of the data storage system(s) 120. In some implementations, the combining may be based at least in part on metadata included in the report description(s) 108, such as result combination information. In some cases, the combining may include one or more join operations. The result data set(s) 118 may then be provided in a report to one or more data consumers, or other users 102. In some cases, the result data set(s) 118 may be presented on the user device(s) 104, through the user interface provided by the query interface module 110. Alternatively, the result data set(s) 118 may be presented to data consumers through other means. An example of providing the result data set(s) 118 is described with reference to FIG. 5. Operations of the query server device(s) 106, including operations of one or both of the query interface module 110 and the query plan processing module 116, are described further with reference to FIGS. 6-9.

In some implementations, the various devices of the environment 100 may communicate with one another using one or more networks. Such networks may include public networks such as the Internet, private networks such as an institutional or personal intranet, or some combination of private and public networks. The networks may include any type of wired or wireless network, including, but not limited to, local area networks (LANs), wide area networks (WANs), wireless WANs (WWANs), wireless LANs (WLANs), and mobile communications networks (e.g. 3G, 4G, and so forth).

Figure 2:
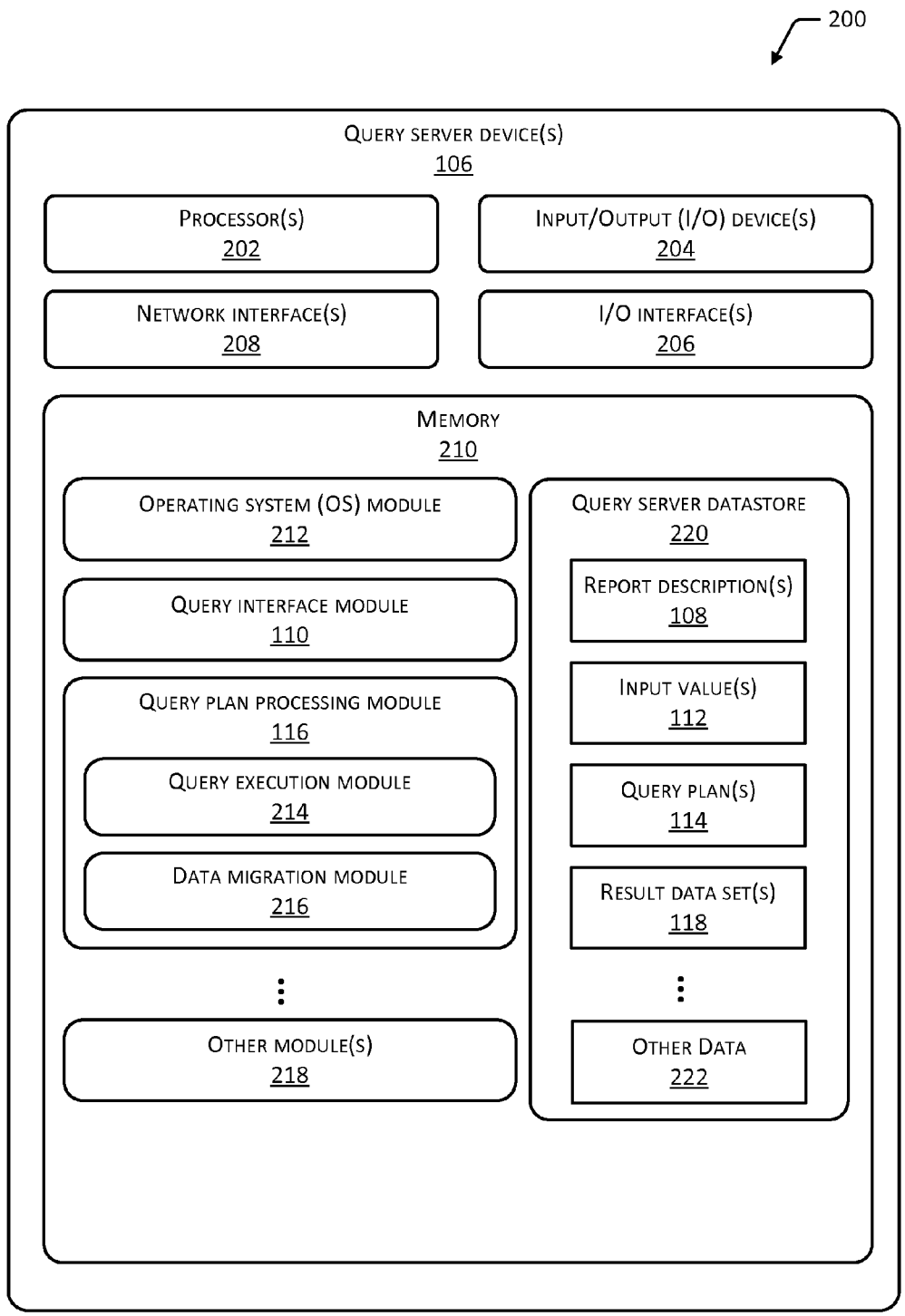
FIG. 2 depicts a block diagram of a query server device configured to perform operations for receiving a report description, providing a query interface, generating and executing the query plan based on the report description, combining result data, presenting the combined result data, and migrating data between datastores with different storage formats.

FIG. 2 depicts a block diagram 200, depicting an example of the query server device(s) 106 shown in FIG. 1. As shown in the block diagram 200, the query server device(s) 106 may include one or more processors 202 configured to execute one or more stored instructions. The processor(s) 202 may comprise one or more cores.

The query server device(s) 106 may include one or more input/output (I/O) devices 204. The I/O device(s) 204 may include input devices such as a keyboard, a mouse, a pen, a game controller, a voice input device, a touch input device, a gestural input device, a haptic input device, or other devices. The I/O device(s) 204 may also include output devices such as a display, a printer, audio speakers, haptic output devices, and so forth. The I/O device(s) 204 may be physically incorporated with the query server device(s) 106, or may be externally placed.

The query server device(s) 106 may include one or more I/O interfaces 206 to enable components of the query server device(s) 106 to control, interface with, or otherwise communicate with the I/O device(s) 204. The I/O interface(s) 206 may enable information to be transferred in or out of the query server device(s) 106, or between components of the query server device(s) 106, through serial communication, parallel communication, or other types of communication. For example, the I/O interface(s) 206 may comply with the RS-232 standard for serial ports, or with the Institute of Electrical and Electronics Engineers (IEEE) 1284 standard for parallel ports. As another example, the I/O interface(s) 206 may be configured to provide a Universal Serial Bus (USB) connection. The query server device(s) 106 may also include one or more busses or other internal communications hardware or software that allow for the transfer of data between the various modules and components of the query server device(s) 106.

The query server device(s) 106 may include one or more network interfaces 208 to enable communications between the query server device(s) 106 and other networked devices, such as the user device(s) 104 or the data storage system(s) 120. The network interface(s) 208 may include one or more network interface controllers (NICs) or other types of transceiver devices configured to send and receive communications over a network.

The query server device(s) 106 may include one or more memories, described herein as memory 210. The memory 210 comprises one or more computer-readable storage media (CRSM). The CRSM may be any one or more of an electronic storage medium, a magnetic storage medium, an optical storage medium, a quantum storage medium, a mechanical computer storage medium, and so forth. The memory 210 provides storage of computer-readable instructions, data structures, program modules, and other data for the operation of the query server device(s) 106.

The memory 210 may include an operating system (OS) module 212. The OS module 212 is configured to manage hardware resources such as the I/O device(s) 204, the I/O interface(s) 206, and the network interface(s) 208, and to provide various services to applications, processes, or modules executing on the processor(s) 202. The OS module 212 may include one or more of the following: any version of the Linux® operating system originally released by Linus Torvalds; any version of iOS™ from Apple Inc. of Cupertino, Calif.; any version of Windows® or Windows Mobile® from Microsoft Corporation of Redmond, Wash.; any version of Android® from Google, Inc. of Mountain View, Calif. and its derivatives from various sources; any version of Palm OS® from Palm, Inc. of Sunnyvale, Calif. and its derivatives from various sources; any version of BlackBerry OS® from BlackBerry Limited of Waterloo, Ontario, Canada; any version of VxWorks® from Wind River Systems, Inc. of Alameda, Calif.; or other operating systems.

In some implementations, the memory 210 includes the query interface module 110. The query interface module 110 may provide one or more user interfaces accessible to the user device(s) 104, enabling the users 102 to provide the report description(s) 108, the input value(s) 112, or other information. The user interface(s) provided by the query interface module 110 are described further with reference to FIGS. 4 and 5. In cases where the user interface(s) are provided through one or more web pages, the query interface module 110 may include a web server such as the Apache Web Server®, from the Apache Software Foundation, Internet Information Services® (IIS), from the Microsoft Corporation of Redmond, Wash., or another web server.

The memory 210 may also include the query plan processing module 116. The query plan processing module 116 may perform operations to execute the queries of the query plan(s) 114, receive the result data set(s) 118 resulting from the execution of the queries, and combine the result data set(s) 118 into a report for storage or presentation to data consumers such as one or more of the user(s) 102. Operations of the query plan processing module 116 are described further with reference to FIGS. 6-9.

In some implementations, the query plan processing module 116 includes a query execution module 214 to execute the one or more queries of the query plan 114 and retrieve the result data set(s) 118 from the data storage system(s) 120. In some implementations, the query plan processing module 116 may also include a data migration module 216, which performs operations for migrating data from one storage format to another storage format. Such migration operations may include converting at least a portion of the data retrieved from one of the non-relational datastore(s) 124 to a relational storage format, and writing the converted data to one of the relational datastore(s) 122. Migration may also be performed to migrate data from one of the relational datastore(s) 122 to one of the non-relational datastore(s) 124. Data migration is described further with reference to FIG. 8. The memory 210 may also include one or more other modules 218, such as a user authentication module, an access control module, and so forth.

The memory 210 may also include a query server datastore 220 to store information for operations of the query server device(s) 106. The query server datastore 220 may comprise a database, array, structured list, tree, or other data structure. The query server datastore 220 may include one or more of the report description(s) 108, the input value(s) 112, the query plan(s) 114, and the result data set(s) 118. The query server datastore 220 may also store other data 222, such as user account information, user authentication information, and so forth. In some implementations, at least a portion of the information stored in the query server datastore 220 may be stored externally to the query server device(s) 106, on other devices that are accessible to the query server device(s) 106 via the I/O interface(s) 206 or the network interface(s) 208.

Figure 3:
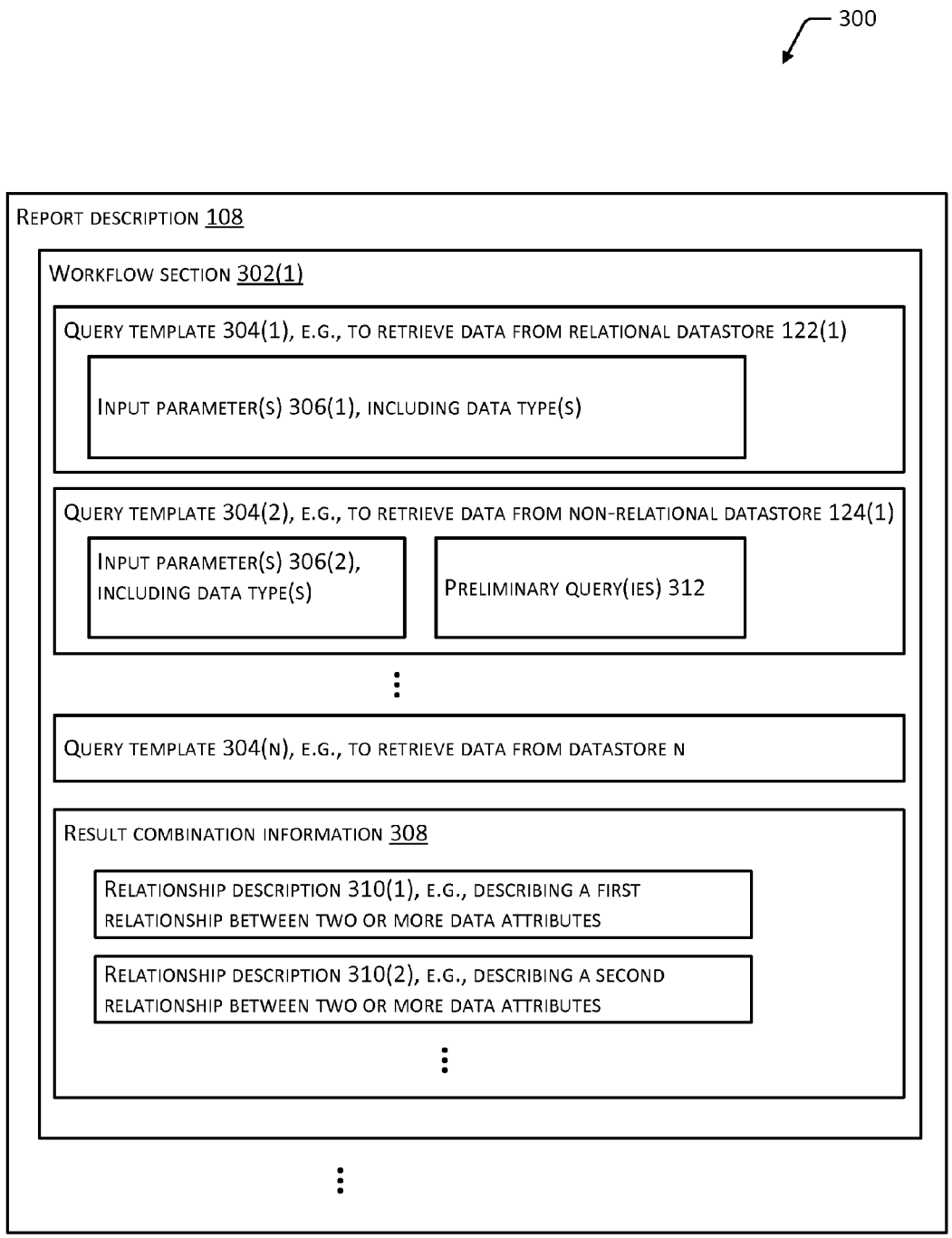
FIG. 3 depicts a schematic of an example data structure for a report description, including one or more query templates and result combination information.

FIG. 3 depicts a schematic 300 of an example data structure for the report description 108. As shown in FIG. 3, the report description 108 may include one or more workflow sections 302. Each workflow section 302 may correspond to a question that a user 102, such as a data consumer, desires to be answered. For example, a workflow may correspond to a question "Is a particular updater causing a spike in updates to a particular datastore?"

Each workflow section 302 may include one or more query templates 304 to generate one or more queries for retrieving data relevant to that question from the data storage system(s) 120. Based on the query template(s) 304, one or more queries may be generated to retrieve data from at least one relational datastore 122, from at least one non-relational datastore 124, or from the relational datastore(s) 122 and the non-relational datastore(s) 124. In some implementations, the query template(s) 304 may be specified such that each of the corresponding queries is generated in a query language that is native to the datastore targeted by the query.

In some implementations, one or more of the query template(s) 304 may include metadata describing one or more input parameters 306. The input parameter(s) 306 for a query template 304 may be presented to the user(s) 102 through the query interface module 110, enabling the user(s) 102 to provide the input value(s) 112 corresponding to the input parameter(s) 306. In some cases, the input parameter(s) 306 may include additional metadata describing their data types, such as numeric data, character or string data, currency data, date/time data, and so forth. In such cases, the query interface module 110 may present a user interface that includes, for each input parameter 306, a user interface element corresponding to the data type for the input parameter 306. For example, an input parameter 306 of a date type may be presented through a user interface element that is a date entry control (e.g., a calendar control), and numeric or text types of input parameters 306 may be presented to text boxes that accept alphanumeric character data. In cases where an input parameter 306 includes a plurality of discrete values for selection (e.g., states, provinces, or prefectures of a country, months of the year, and so forth), the input parameter 306 may be presented via a drop-down list of options or a similar control in the user interface.

In some implementations, the input parameter(s) 306 for a query template 304 may be determined based on an analysis of the query template 304 to identify one or more missing or unresolved keys, conditions, or other data elements in the query template 304. Each of the missing or unresolved data elements in the query template 304 may then be presented as an input parameter 306, for which an input value 112 is to be requested for the user(s) 102.

Each workflow section 302 may also include additional metadata, such as result combination information 308. The result combination information 308 may include one or more relationship description(s) 310, each describing a relationship between two or more data attributes referenced by the one or more query templates 304. In some implementations, the query plan processing module 116 may employ the relationship description(s) 310 to join or otherwise combine data from result sets retrieved from different datastores or from the same datastore. The combined result data may then be presented to the user(s) 102 in a report, as the result data set(s) 118.

In some cases, the input value(s) 112 corresponding to the input parameter(s) 306 of a query template 304 may be generated through the execution of one or more preliminary queries 312. In such cases, the one or more preliminary queries 312 may be described in the metadata for one or more query templates 304, as shown in the example query template 304(2) of FIG. 3. Such implementations are described further with reference to FIG. 9.

Figure 4:
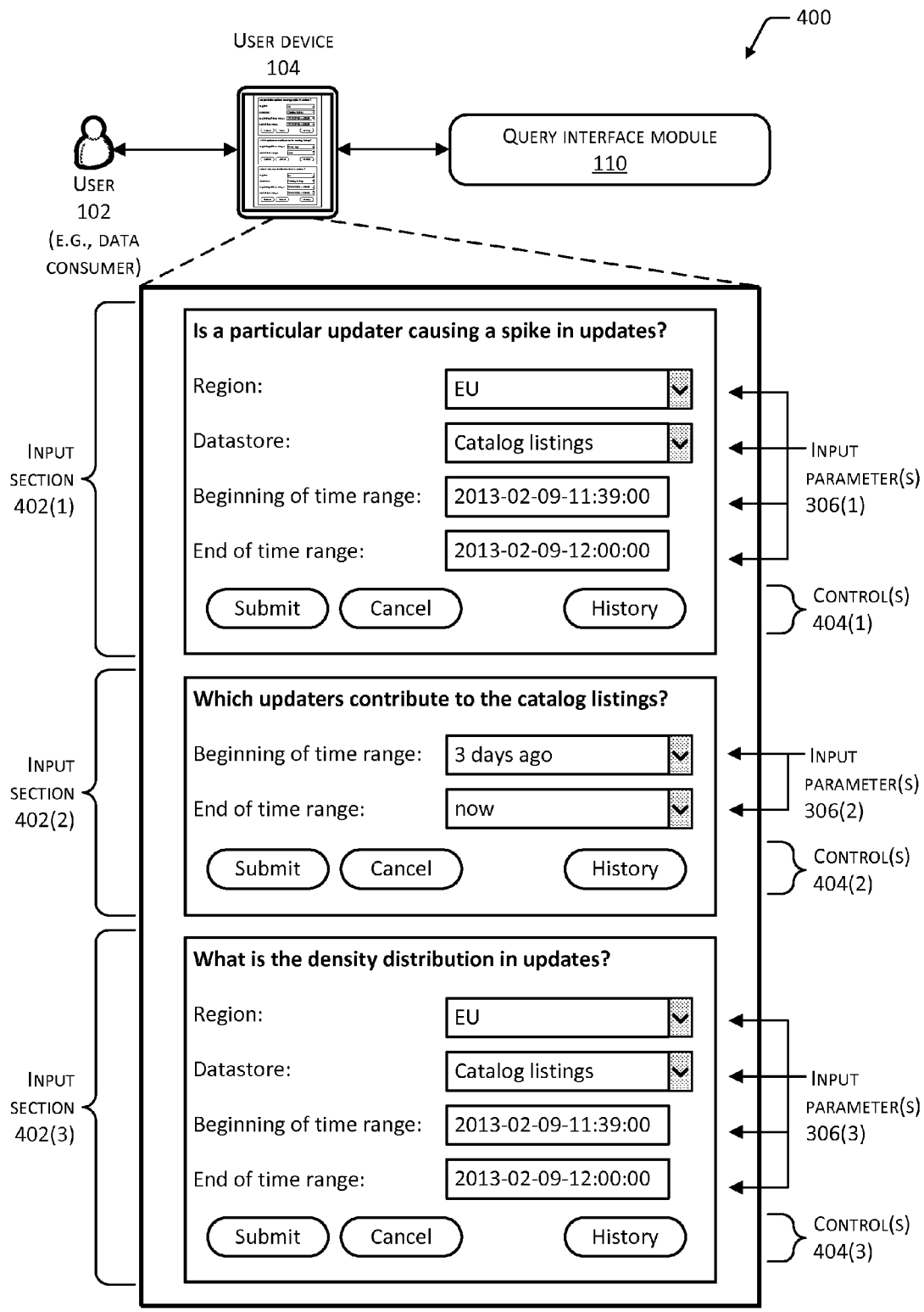
FIG. 4 depicts an example user interface to enable a user to enter input values for input parameters that are determined based on analyzing the report description.

FIG. 4 depicts an example user interface 400 to enable the user(s) 102 to enter the input value(s) 112. In some implementations, the user interface 400 may be generated dynamically based on an analysis of the report description 108, and may be presented by the query interface module 110. The user interface 400 may be provided through a web site accessed by a web browser executing on the user device(s) 104. Alternatively, the user interface 400 may be provided by another application executing on the user device(s) 104.

In some implementations, the user 102 of the user device 104 may be identified or authenticated to the user interface 400, such as through a login, password, identification number, biometric data, security certification, public or private encryption keys, and so forth. The user 102 may then be presented with one or more input sections 402, each corresponding to a workflow described in a workflow section 302 of the report description 108. Each input section 402 may present one or more query templates 304 described in the corresponding workflow section 302. The input section(s) 402 may each include one or more user interface elements to enable a user 102 to enter an input value 112 corresponding to each of the one or more input parameters 306 associated with a query template 304. Implementations support any type of user interface element for entering input values, including text boxes, drop-down lists, date entry controls, radio buttons, or other types of user interface elements for data entry. As described above, in some cases the user interface elements are dynamically generated to correspond to data types for the input parameter(s) 306, as indicated by metadata included in the report description 108.

Each input section 402 may also include one or more controls 404 to enable a user to enter commands or instructions to the user interface 400. In the example shown, each input section 402 includes controls 404 to enable a user to submit the entered values for the input parameters 306, or cancel the entered values. Each input section 402 also includes a control 404 to enable a user to view a history of the result data set(s) 118 generated from previous executions of queries generated from the query templates 304 in the workflow corresponding to the input section 402.

In the example shown in FIG. 4, the user interface 400 has been dynamically generated based on an analysis of a report description 108 that includes three workflows. The input section 402(1) corresponds to a first workflow including one or more query templates to determine whether a particular updater (e.g., a data updating user or process) is causing a spike in updates to one or more data attributes in one or more datastores. In this example, four input parameters 306(1) have been determined based on an analysis of the query template 304. The four input parameters 306(1) include parameters for region, datastore, beginning of time range, and end of time range. In some cases, the particular type of user interface element for entering an input value 112 may be based on a data type of the corresponding input parameter 306. For example, in the input section 402(1), the elements for entering the input values 112 corresponding to region and datastore are drop-down lists, whereas the elements for entering the input values 112 corresponding to beginning and end of time range are text entry fields. The result data set(s) 118 resulting from this workflow may include a list of updaters, with a number of updates associated with each updater.

The input section 402(2) corresponds to a workflow including one or more query templates to determine which updaters are contributing to a particular datastore (e.g., catalog listings). In this example, two input parameters 306(2) have been determined based on an analysis of the query template 304. The two input parameters 306(2) include parameters for beginning and end of time range. The result data set(s) 118 resulting from this workflow may include a list of updaters, with a frequency or number of updates associated with each updater. An example of such output is provided in FIG. 5.

The input section 402(3) corresponds to a workflow including one or more query templates to determine a density distribution in updates. In this example, four input parameters 306(3) have been determined based on an analysis of the query template 304. The four input parameters 306(3) include parameters for region, datastore, beginning of time range, and end of time range. The result data set(s) 118 resulting from this workflow may include a first column listing values for a number updates made, and a second column listing a number of the updating entities that have made the corresponding number of updates. Implementations support any number of workflows included in each report description 108, with any number of query templates 304 or input parameters 306 associated with each workflow.

Figure 5:
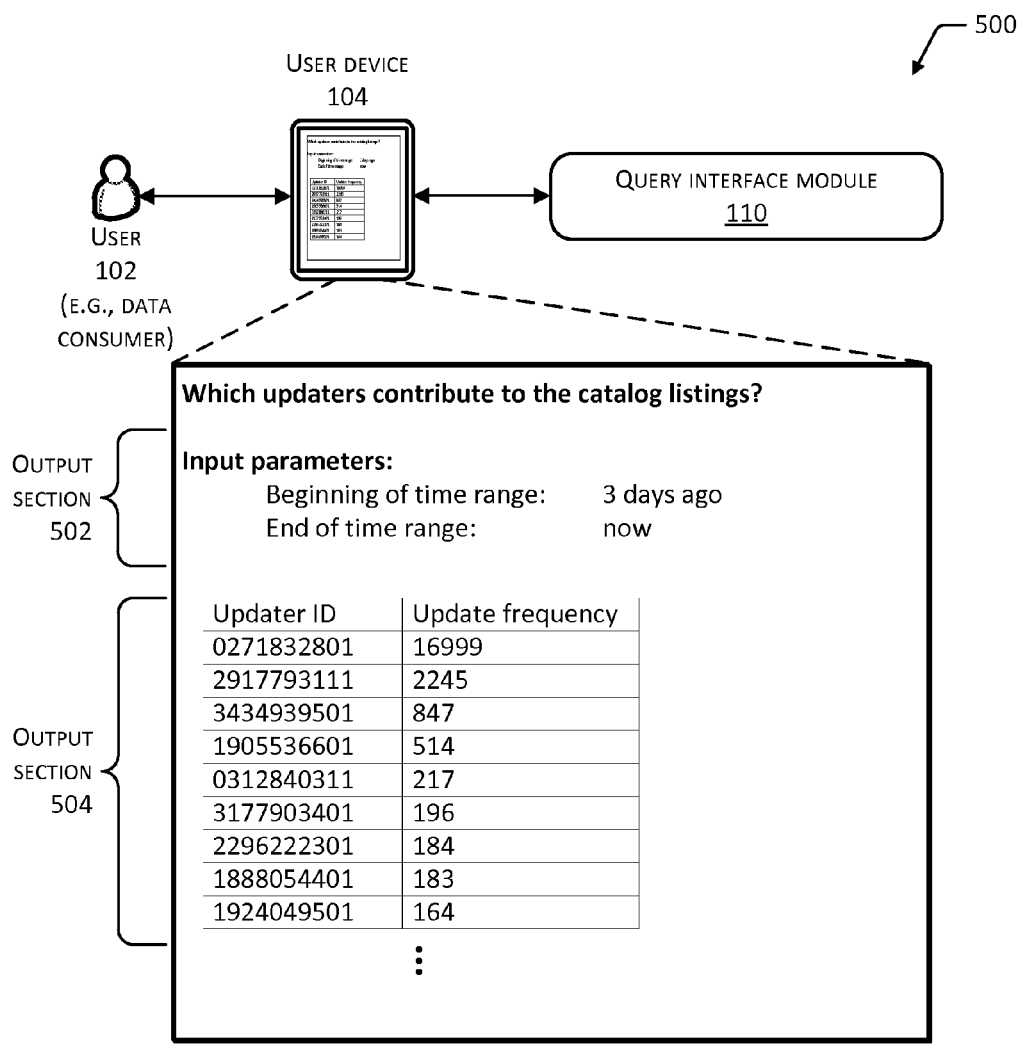
FIG. 5 depicts an example user interface for presenting the combined result data to the user.

FIG. 5 depicts an example user interface 500 for presenting the result data set(s) 118 to the user(s) 102. In some implementations, the user interface 500 may be generated dynamically to present the result data set(s) 118, and may be provided by the query interface module 110. The user interface 500 may be provided through a web site accessed by a web browser executing on the user device(s) 104. Alternatively, the user interface 500 may be provided by another application executing on the user device(s) 104.

In some implementations, the user interfaces 400 and 500 may be presented as multiple pages within a web site. In such cases, a user gesture to the control 404 for submitting input values may prompt generation and presentation of the user interface 500 to present result data set(s) 118. The user interface 500 may provide the result data set(s) 118 that are generated from the execution of one or more queries of the query plan 114, each of the queries having been generated based on a corresponding query template 304 and one or more input values 112 entered through the user interface 400.

In the example of FIG. 5, one or more queries have been executed for a workflow to determine which updates contribute to catalog listings, based on input value(s) 112 entered in the input section 402(2) of FIG. 4. The user interface 500 includes an output section 502 listing the input parameters 306(2) and the entered input value(s) 112 corresponding to the input parameters 306(2). The user interface 500 also includes an output section 504, presenting the result data set(s) 118 combined into a report based on the result combination information 308. In this example, the output section 504 presents a list of updater identifiers (IDs) and an update frequency corresponding to each update ID. Implementations support any type, format, or amount of data for the result data set(s) 118 presented by the user interface 500. For example, in some cases the result data set(s) 118 may be formatted into tables, graphs, charts, pie charts, bar graphs, or other formats for data presentation.

Although FIGS. 4 and 5 show example user interfaces 400 and 500 with various user interface elements in particular positions, the particular arrangement shown is not in any way limiting of implementations. Implementations may employ a user interface that includes more or fewer user interface elements, more or fewer controls, or different types of user interface elements or controls, in any combination and in any arrangement to enable functionality of the implementations. Further, implementations may support multiple user interfaces (e.g., multi-page web sites) with functionality that is spread across various dialogs, windows, frames, or pages. Implementations may also support dynamically generated interfaces, where the particular user interface elements displayed and the location or duration of their display is based on a particular state of the system, characteristics of the user device 104, the user 102, or other factors. Moreover, although the example user interfaces 400 and 500 are depicted as visual displays, the user interfaces 400 and 500 may employ other means for presenting data such as audio or haptic effects.

Figure 6:
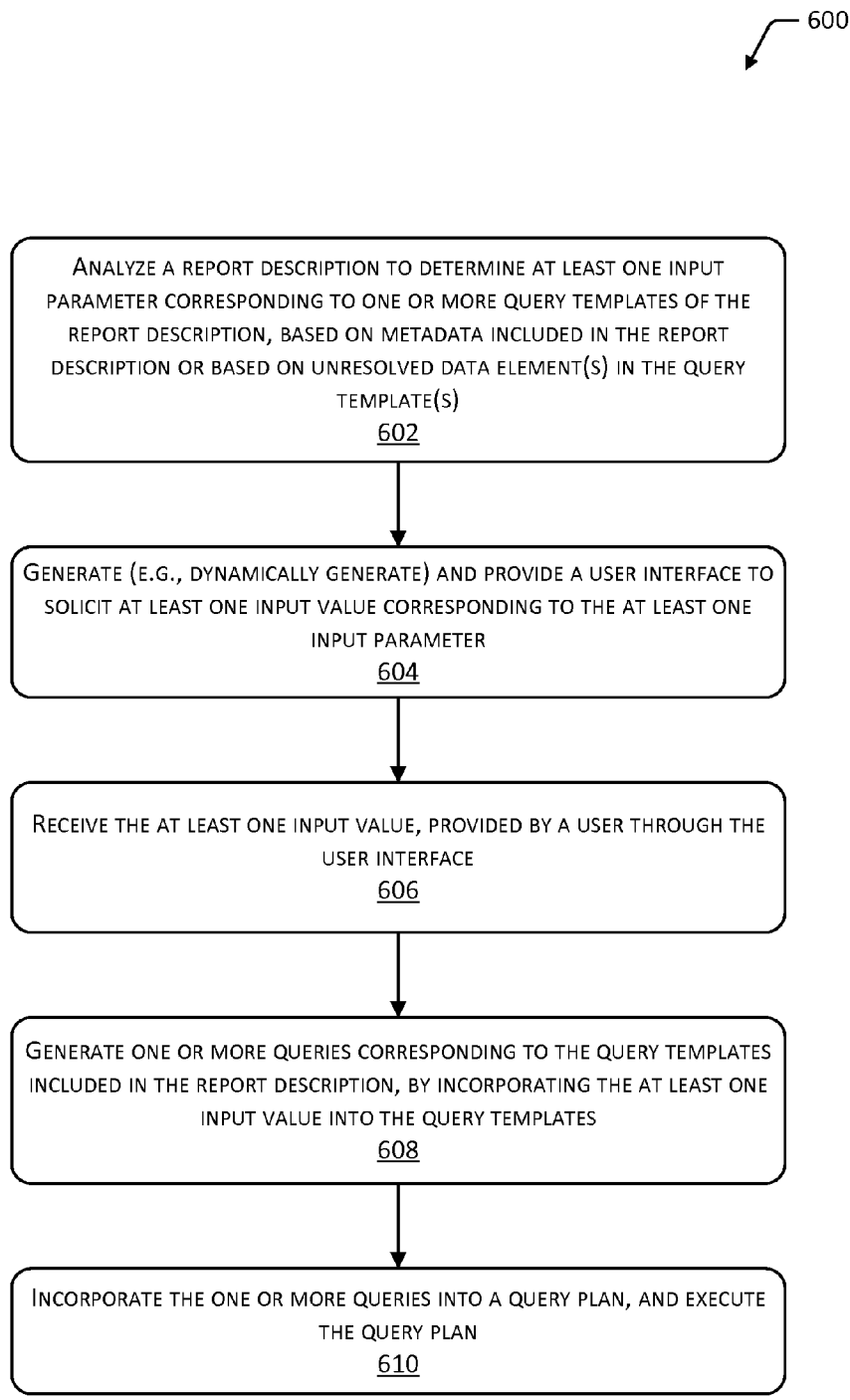
FIG. 6 depicts a flow diagram of a process for dynamically generating a user interface to solicit input values for one or more input parameters that are determined based on an analysis of the report description.

FIG. 6 depicts a flow diagram 600 of a process for dynamically generating a user interface, such as the user interface 400, to solicit the input value(s) 112 from the user(s) 102, and to generate the queries of the query plan 114 based on the query template(s) 304 and the input value(s) 112. Operations included in the process may be performed on one or both of the user device(s) 104 or the query server device(s) 106. Operations performed on the query server device(s) 106 may be performed by the query interface module 110, the query plan processing module 116, or other modules.

At 602, the report description 108 may be analyzed to determine at least one input parameter 306 corresponding to a query template 304. As described above with reference to FIG. 3, in some implementations this determination may be based on the metadata included in the report description, unresolved data element(s) in the query template(s), and so forth.

At 604, a user interface is generated to solicit and receive the one or more input values 112 corresponding to the identified input parameter(s) 306 for the query template(s) 304 described in the report description 108. In some cases, at least a portion of the user interface may be dynamically generated after receiving and analyzing the report description 108. Alternatively, at least a portion of the user interface may be static and substantially similar for multiple report descriptions 108. The user interface may be generated as described above with regard to FIG. 4.

At 606, one or more input values 112 may be received, each corresponding to an input parameter 306. At 608, one or more of the queries may be generated, each query based on incorporating the received input value(s) 112 into an associated query template 304. At 610, the generated queries may be incorporated in the query plan 114 and executed, as described below with reference to FIG. 7, to generate the result data set(s) 118.

Figure 7:
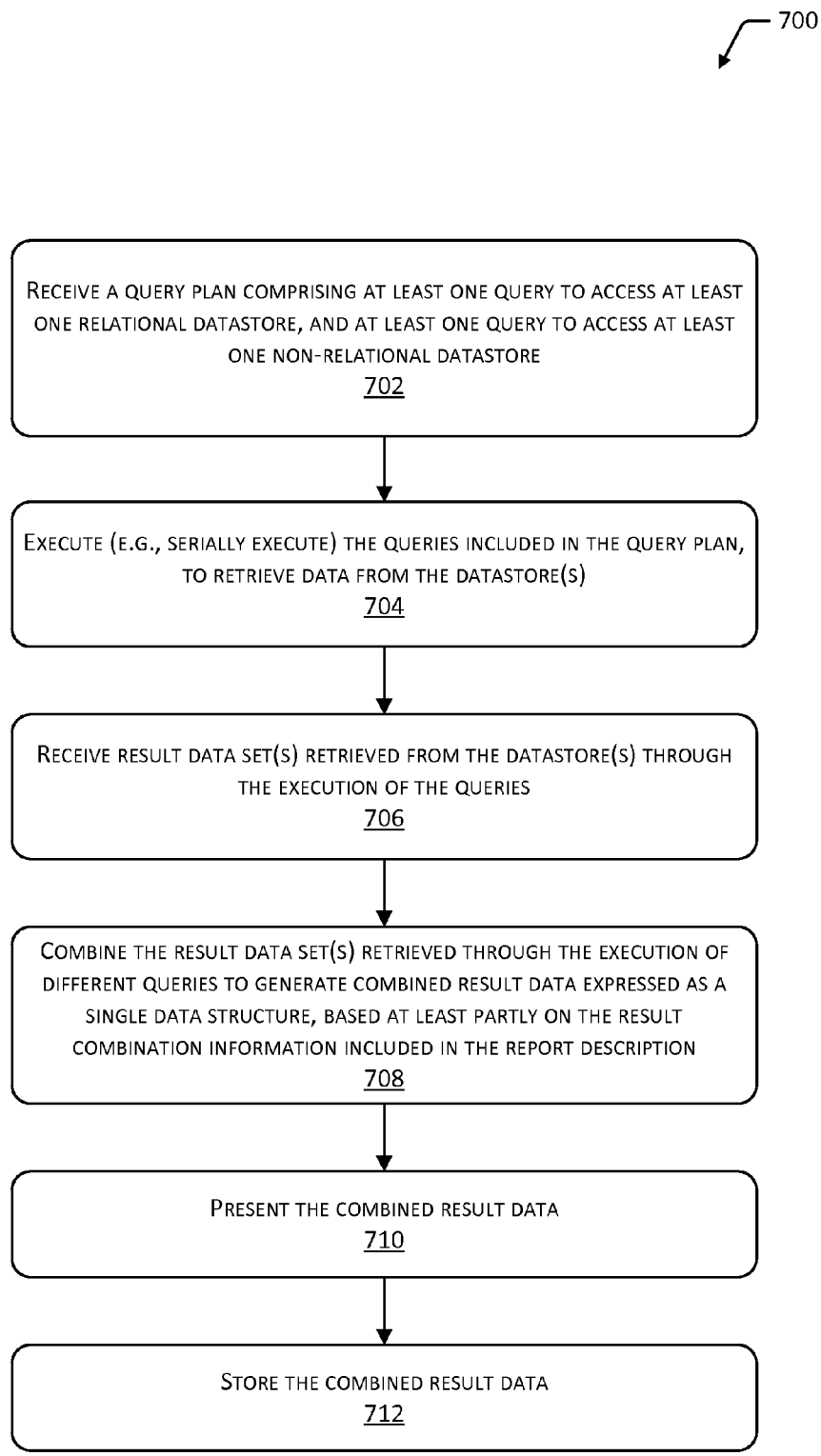
FIG. 7 depicts a flow diagram of a process for receiving a query plan, executing queries included in the query plan, and presenting combined result data resulting from the query execution.

FIG. 7 depicts a flow diagram 700 of a process for executing the queries included in the query plan 114, and presenting combined result data resulting from the query execution. Operations included in the process may be performed on one or both of the user device(s) 104 or the query server device(s) 106. Operations performed on the query server device(s) 106 may be performed by the query interface module 110, the query plan processing module 116, or other modules.

At 702, the query plan 114 is received. As described above, the query plan 114 may include one or more queries to access and retrieve data from the relational datastore(s) 122, from the non-relational datastore(s) 124, or from both relational and non-relational datastores.

At 704, the one or more queries of the query plan 114 are executed to retrieve the result data set(s) 118 from one or more datastores in the data storage system(s) 120. In some implementations, the query execution is serial or non-concurrent, such that one query is executing at a given time. Alternatively, the query execution may be at least partly concurrent, such that at least some of the queries, or a portion thereof, are executed concurrently.

At 706, the result data set(s) 118 are received, generated from the execution of the queries of the query plan 114. At 708, the data from the result data set(s) 118 may be combined based on the result combination information 308 included in the report description 108. The combination may generate combined result data expressed as a single data structure. In some implementations, the combination may include a coupling of data attributes in multiple different datastores, and the multiple different datastores may employ different storage formats. For example, the combination may include combining data for a data attribute from a relational datastore 122 with data for a data attribute from a non-relational datastore 124. The combination may be based on the relationship description(s) 310, each indicating a relationship between data for a first data attribute in a first datastore and a second data attribute in a second datastore. In some cases, the combination may be a join operation that is similar to a SQL join instruction.

At 710, the combined result data may be presented to the user(s) 102. In some cases, the presentation of the combined result data may be through a user interface provided by the query interface module 110, such as the user interface 500. In some implementations, at 712 the combined result data may be stored in memory on the query server device(s) 106 or on another device. Such stored result data may be accessed during future executions of the same report description 108, or during future executions of queries that are the same or substantially similar to those included in the query plan 114.

Figure 8:
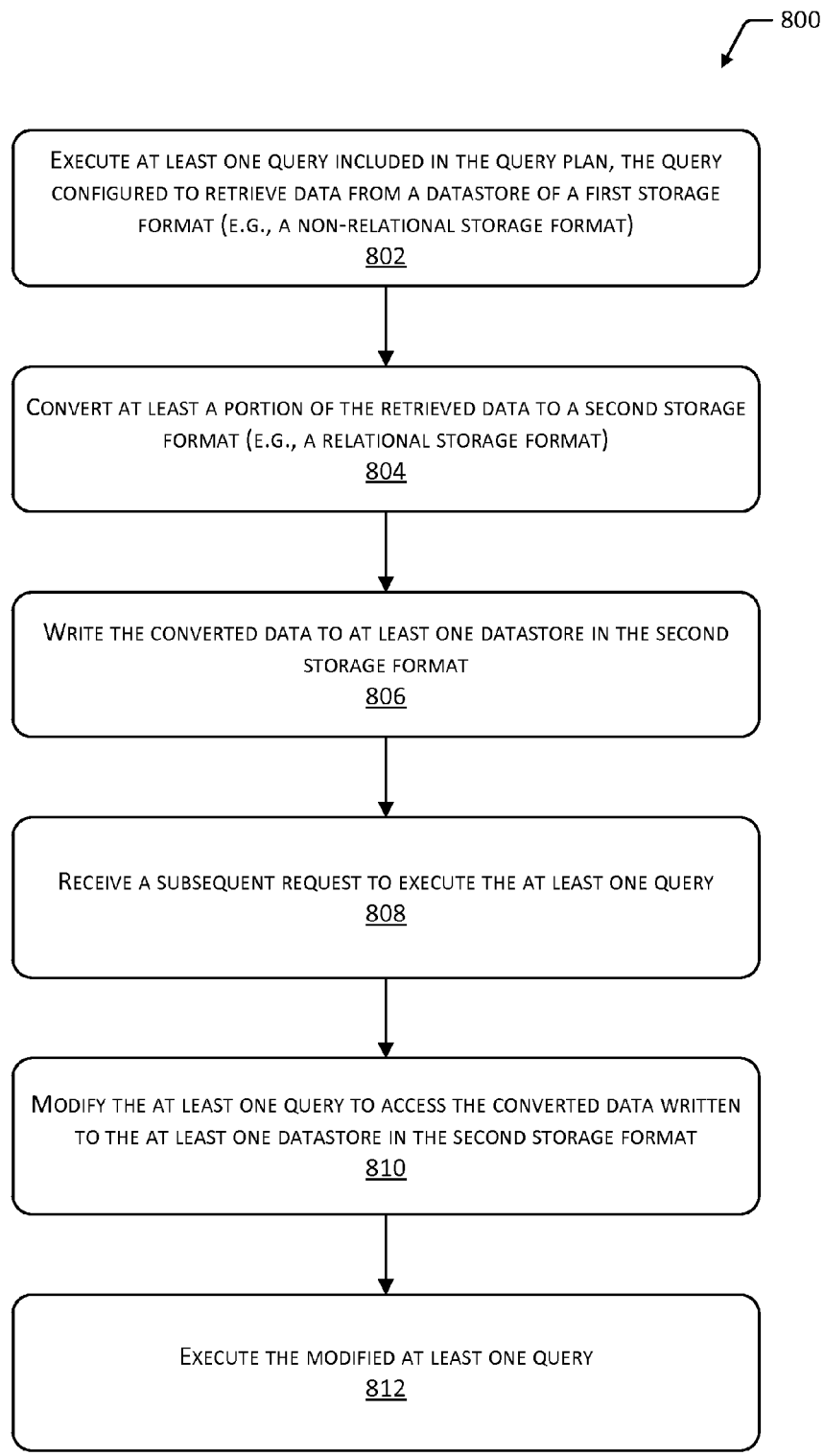
FIG. 8 depicts a flow diagram of a process for transforming or migrating data from a datastore of a first storage format (e.g., a non-relational datastore) to a datastore of a second storage format (e.g., a relational datastore), and executing subsequent queries against the datastore of the second type.

FIG. 8 depicts a flow diagram 800 of a process for migrating data from a datastore of a first storage format (e.g., a non-relational datastore 124) to a datastore of a second storage format (e.g., a relational datastore 122), such that subsequent queries may be executed against the datastore of the second storage format. Operations included in the process may be performed on one or both of the user device(s) 104 or the query server device(s) 106. Operations performed on the query server device(s) 106 may be performed by the query interface module 110, the query plan processing module 116, or other modules.

At 802, at least one query of the query plan 114 is executed, as described above. In some cases, the at least one query may be executed to retrieve data from a datastore that supports a first storage format. For example, the at least one query may be executed against a non-relational datastore 124. In some cases, the at least one query may be expressed in a native query language supported by the targeted datastore.

At 804, at least a portion of the retrieved data may be converted from the first storage format to a second storage format. For example, the conversion may be from a non-relational storage format to a relational storage format (e.g., including one or more tables with rows and columns).

At 806, the converted data may be written to at least one datastore that supports the second storage format. After 806 is complete, at least a portion of the retrieved data may have been migrated from the datastore that supports the first storage format (e.g., a non-relational datastore 124) to the datastore that supports the second storage format (e.g., a relational datastore 122). Such a migration may be performed from a non-relational datastore 124 to a relational datastore 122, from a relational datastore 122 to a non-relational datastore 124, between datastores that support different storage formats of a relational type, or between datastores that support different storage formats of a non-relational type. In some cases, a datastore may store data corresponding to a large number of data attributes (e.g., thousands of data attributes), and the user(s) 102 (e.g., data consumers) may frequently access data for a subset of those data attributes. By migrating the portion of data corresponding to the frequently accessed data attributes, the more frequently accessed data may be more readily available to data consumers.

At 808, a subsequent request may be received to execute the at least one query executed at 802. At 810, the at least one query may be modified to access the converted data that was previously written (e.g., at 806) to the datastore that supports the second storage format. Such a modification may include translating the at least one query to a native query language supported by the datastore that supports the second storage format. For example, in cases where the second storage format is a relational storage format, the at least one query may be translated into a SQL query.

At 812, the modified at least one query may be executed, as part of the execution of the query plan 114.

Figure 9:
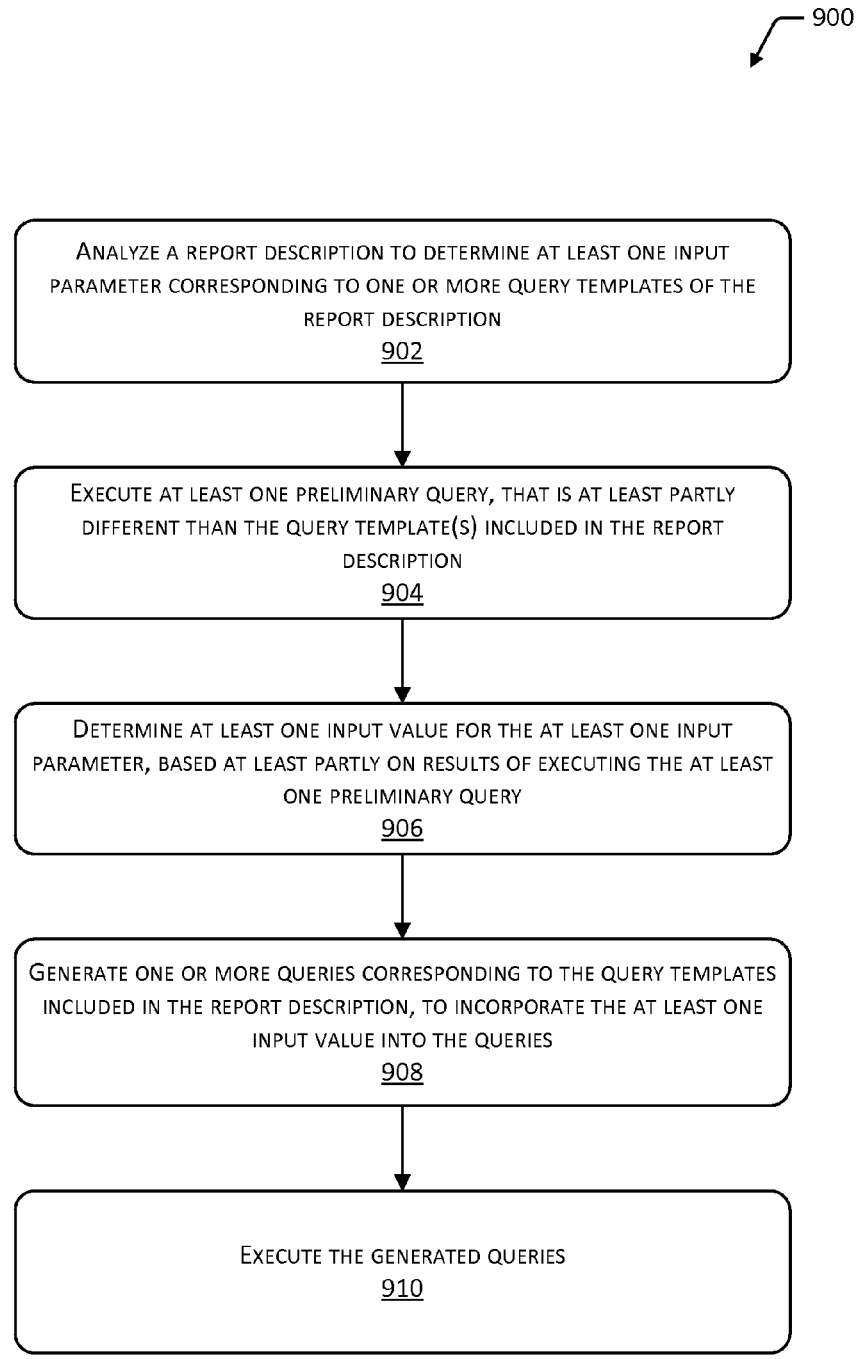
FIG. 9 depicts a flow diagram of a process for determining one or more input values for the input parameter(s) included in a report description, based on executing one or more preliminary queries described in the report description.

FIG. 9 depicts a flow diagram 900 of a process for determining one or more input values 112 for the input parameter(s) 306 based on executing one or more preliminary queries. Operations included in the process may be performed on one or both of the user device(s) 104 or the query server device(s) 106. Operations performed on the query server device(s) 106 may be performed by the query interface module 110, the query plan processing module 116, or other modules.

At 902, the report description 108 is analyzed to determine at least one input parameter 306 corresponding to one or more query templates 304 included in the report description 108. This operation may proceed similarly to 602 described above.

At 904, at least one preliminary query 312 is executed. In some cases, the at least one preliminary query 312 may be at least partly different than the queries generated based on the one or more query templates 304 included in the report description 108. The at least one preliminary query 312 may be executed to retrieve data from one or more datastores of the data storage system(s) 120. In some cases, the one or more preliminary queries 312 may be described in the report description 108. For example, the metadata for a query template 304 may describe one or more preliminary queries 312 to be executed to generate the input value(s) 112 corresponding to the input parameter(s) 306.

At 906, the at least one input value 112 corresponding to the at least one input parameter 306 may be determined based on the one or more results of executing the at least one preliminary query 312.

At 908, one or more of the queries of the query plan 114 may be generated based on the at least one input value 112 determined at 906, and based on the query template(s) 304. At 910, the one or more generated queries may be executed. Operations 908 and 910 may proceed similarly to operations 608 and 610, as described above.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:
  receiving a report description comprising two or more query templates for generating two or more queries to access data from a plurality of datastores including at least one relational datastore and at least one non-relational datastore, the two or more queries including at least one query to access the at least one relational datastore and at least one query to access the at least one non-relational datastore, the report description further comprising result combination information;
  analyzing the report description to determine:
    at least one input parameter associated with the two or more query templates; and
    at least one preliminary query configured to access data corresponding to the at least one input parameter from one or more datastores of the plurality of datastores;
  executing the at least one preliminary query to determine at least one input value corresponding to the at least one input parameter from the one or more datastores of the plurality of datastores;
  generating the two or more queries corresponding to the two or more query templates, based at least partly on the at least one input value;
  executing the two or more queries to retrieve result data sets from the at least one relational datastore and the at least one non-relational datastore;
  combining the result data sets retrieved from the at least one relational datastore and the at least one non-relational datastore to generate combined result data expressed in a single data structure, the combining of the result data sets based at least partly on the result combination information included in the report description;
  converting at least a portion of a result data set retrieved from the at least one non-relational datastore to converted data expressed in a relational storage format; and
  writing the converted data to the at least one relational datastore.

2. The method of claim 1, wherein:
  analyzing the report description further comprises determining the at least one input parameter for which the two or more query templates do not include the at least one input value.

3. The method of claim 1, wherein the executing of the two or more queries includes serially and non-concurrently executing the two or more queries.

4. The method of claim 1, further comprising:
  presenting at least a portion of the combined result data.

5. A system, comprising:
  a plurality of datastores, including at least one relational datastore and at least one non-relational datastore;
  at least one memory storing computer-executable instructions; and
  at least one processor in communication with the plurality of datastores, and configured to access the at least one memory and execute the computer-executable instructions to:
    receive a report description comprising two or more query templates for generating two or more queries to access data from the plurality of datastores, the two or more queries including at least one query for accessing the at least one relational datastore and at least one query for accessing the at least one non-relational datastore, the report description further comprising result combination information;
    determine, based at least partly on the report description, at least one input parameter associated with at least one of the two or more query templates;
    determine, based at least partly on the report description, at least one preliminary query configured to access data corresponding to the at least one input parameter from one or more datastores of the plurality of datastores;
    determine, based at least partly on the at least one preliminary query, at least one input value corresponding to the at least one input parameter from the one or more datastores of the plurality of datastores;
    generate the two or more queries, by including the at least one input value in the two or more query templates;
    execute the two or more queries to retrieve result data sets from the at least one relational datastore and the at least one non-relational datastore;
    convert at least a portion of at least one result data set retrieved from the at least one non-relational datastore to converted data expressed in a relational storage format; and
    write the converted data to the at least one relational datastore.

6. The system of claim 5, the computer-executable instructions further configured to:
  provide a user interface to solicit at least one second input value corresponding to the at least one input parameter, wherein the two or more queries further include the at least one second input value in the two or more query templates.

7. The system of claim 5, wherein the at least one input parameter includes at least one condition on at least one data attribute referenced by at least one of the two or more queries, the at least one condition including one or more of the following: a value for the at least one data attribute; a set of values for the at least one data attribute; or a range of values for the at least one data attribute.

8. The system of claim 6, wherein the user interface is dynamically generated to include the at least one input parameter, based on the analyzing of the report description.

9. The system of claim 5, wherein:
  the result combination information includes at least one relationship between a first data attribute and a second data attribute, the first data attribute including at least one result data set retrieved from the at least one relational datastore, and the second data attribute including at least one result data set retrieved from the at least one non-relational datastore.

10. The system of claim 5, wherein the computer-executable instructions are further configured to:
receive a request to execute the at least one query for accessing the at least one non-relational datastore;
modify the at least one query for accessing the at least one non-relational datastore, to access the converted data written to the at least one relational datastore; and
execute the modified at least one query.

11. The system of claim 5, the computer-executable instructions further configured to:
determine the at least one input parameter associated with the at least one of the two or more query templates, based at least in part on metadata included in the report description.

12. The system of claim 5, wherein the computer-executable instructions are further configured to:
combine at least a portion of the result data sets to generate combined result data, the combining based at least partly on the result combination information included in the report description; and
store the combined result data.

13. One or more non-transitory computer-readable media storing instructions which, when executed, instruct at least one processor to perform actions comprising:
receiving a report description comprising result combination information and two or more query templates for generating two or more queries, the two or more queries including:
at least one query for accessing at least one relational datastore in a plurality of datastores; and
at least one query for accessing at least one non-relational datastore in the plurality of datastores;
determining, based at least partly on the report description:
at least one input parameter associated with at least one of the two or more query templates; and
at least one preliminary query configured to access data corresponding to the at least one input parameter from one or more datastores of the plurality of datastores;
determining, based at least partly on the at least one preliminary query, at least one input value corresponding to the at least one input parameter from the one or more datastores of the plurality of datastores;
generating the two or more queries, based at least partly on the at least one input value and the two or more query templates;
executing the two or more queries to retrieve result data sets from the at least one relational datastore and the at least one non-relational datastore;
converting data retrieved from the at least one non-relational datastore to converted data expressed in a relational storage format; and
writing the converted data to the at least one relational datastore.

14. The one or more non-transitory computer-readable media of claim 13, the actions further comprising:
providing an interface to solicit at least one additional input value corresponding to the at least one input parameter;
receiving the at least one additional input value through the interface; and
generating the two or more queries by incorporating the at least one additional input value into the two or more query templates.

15. The one or more non-transitory computer-readable media of claim 13, wherein the at least one input parameter is determined based on metadata associated with the at least one of the two or more query templates in the report description.

16. The one or more non-transitory computer-readable media of claim 14, wherein the at least one input parameter is determined based on identifying at least one unresolved data element in the at least one of the two or more query templates.

17. The one or more non-transitory computer-readable media of claim 13, wherein the at least one input parameter includes at least one condition on at least one data attribute referenced by at least one of the two or more queries, the at least one condition including one or more of the following: a value for the at least one data attribute; a set of values for the at least one data attribute; or a range of values for the at least one data attribute.

18. The one or more non-transitory computer-readable media of claim 13, wherein the executing of the two or more queries includes serially and non-concurrently executing the two or more queries.

19. The one or more non-transitory computer-readable media of claim 13, the actions further comprising:
receiving a request to execute the at least one query for accessing the at least one non-relational datastore;
modifying the at least one query for accessing the at least one non-relational datastore, to access the converted data written to the at least one relational datastore; and
executing the modified at least one query.

20. The one or more non-transitory computer-readable media of claim 13, the actions further comprising:
combining at least a portion of the result data sets resulting from the executing of the two or more queries to generate combined result data, based at least partly on the result combination information; and
presenting the combined result data.

* * * * *